United States Patent [19]

Siu et al.

[11] Patent Number: 5,883,924

[45] Date of Patent: Mar. 16, 1999

[54] METHOD AND APPARATUS FOR PCR JITTER MEASUREMENT IN AN MPEG-2 TRANSPORT STREAM USING SLIDING WINDOW

[75] Inventors: Michael Yiu-Kwan Siu, Vancouver; Trevor S. R. Dyck, Burnaby; Simon Alexander Block, Vancouver; Chong T Ong, Richmond, all of Canada

[73] Assignee: Hewlett Packard Company, Palo Alto, Calif.

[21] Appl. No.: 878,423

[22] Filed: Jun. 18, 1997

Related U.S. Application Data

[63] Continuation-in-part of Ser. No. 632,036, Apr. 12, 1996, Pat. No. 5,774,497.

[51] Int. Cl.[6] .................................................. H03B 3/46
[52] U.S. Cl. ...................... 375/226; 375/371; 370/468; 370/516; 348/464; 348/500
[58] Field of Search ..................... 375/224, 226, 375/228, 371; 370/468, 516; 348/464, 497, 500, 510, 512

[56] References Cited

U.S. PATENT DOCUMENTS

| | | | |
|---|---|---|---|
| 5,533,021 | 7/1996 | Branstad et al. | 370/396 |
| 5,537,408 | 7/1996 | Branstad et al. | 370/473 |
| 5,640,388 | 6/1997 | Woodhead et al. | 370/468 |

*Primary Examiner*—Young T. Tse

[57] ABSTRACT

A method and a test instrument are provided for measuring program clock reference (PCR) jitter in a data stream, such as an MPEG-2 transport stream. The test instrument includes a line interface circuit for receiving the data stream, a digital computer for processing the data stream and a local clock for generating timestamps. The digital computer extracts from the data stream a PCR sample value which represents a count of a system time clock used to generate the data stream. The timestamp is obtained from the local clock and is associated with the PCR sample value. The digital computer determines a reconstructed system time clock from a set of values including the PCR sample value and the timestamp, and previously-received PCR sample values and associated timestamps within a window representative of a predetermined time interval. The window is shifted as new PCR sample values are received. The digital computer determines a PCR jitter value for the PCR sample value by determining a deviation of the PCR sample value from the reconstructed system time clock. The PCR jitter value may be displayed on a display unit, preferably in a histogram.

20 Claims, 8 Drawing Sheets

METHOD AND APPARATUS FOR PCR JITTER MEASUREMENT IN AN MPEG-2 TRANSPORT STREAM USING SLIDING WINDOW

CROSS REFERENCE TO RELATED APPLICATION

This application is a continuation-in-part of application Ser. No. 08/632,036, filed Apr. 12, 1996, now U.S. Pat. No. 5,774,497.

FIELD OF THE INVENTION

This invention relates to analysis of data streams transmitted through a data communication channel and, more particularly, to test instruments and methods for measuring program clock reference (PCR) jitter in an MPEG-2 transport stream.

BACKGROUND OF THE INVENTION

In the field of data communications, one highly demanding application is the transmission of full motion video, such as may be required for video-on-demand applications. Various protocols which involve compression of digitized video information have been proposed. One such protocol is the MPEG-2 transport stream, as defined in standard ISO/IEC 13818-1: 1996 promulgated by the ISO/IEC. The MPEG-2 transport stream involves transmission of video and audio information in transport stream packets of 188 bytes in length. Each packet includes a header, which contains control information, and a payload, which contains video or audio information. The MPEG-2 transport stream may carry multiple different programs simultaneously. Each packet in the transport stream is associated with a program by a packet identifier (PID) contained in the header. The header is of variable length, depending on whether it contains an adaptation field. The adaptation field contains control information that is not necessarily present in every transport stream packet.

One of the fields that may be contained in the adaptation field is a program clock reference (PCR). The PCR is representation of a system time clock that was used at the source to encode the data in the transport stream packet. The system time clock typically has a frequency of 27 MHz. Each PCR field contains a PCR sample value which represents a count of the system time clock at the time when the transport stream packet was encoded for transmission. PCR sample values for a particular program are received with different transport stream packets having the same PID. A series of PCR samples can be used to reconstruct the system time clock at the decoder end of the communication channel.

The MPEG-2 transport stream may, for example, be transmitted through asynchronous transfer mode (ATM) networks developed for high speed, packetized digital transmission of data, audio and video. One of the parameters that is used in characterizing an MPEG-2 transport stream is PCR jitter. In an ideal communication channel, all transport stream packets, and therefore all PCR samples, are received a fixed time after transmission. However, in a real communication channel, variable delays may be introduced by different channel elements. For example, different transport stream packets may follow different network paths in reaching the final destination. Variations in arrival times produce PCR jitter. PCR jitter is described in standard ISO/IEC 13818-9: 1996.

SUMMARY OF THE INVENTION

According to the present invention, methods and apparatus for measuring program clock reference (PCR) jitter in a data stream containing digitally encoded information and PCR samples are provided. The data stream typically comprises an MPEG-2 transport stream. The method of the invention comprises the steps of providing a test instrument including a line interface circuit for receiving a data stream, a digital computer connected to the line interface circuit for processing the data stream, and a local clock for generating timestamps. The digital computer extracts from the data stream a PCR sample value which represents a count of a system time clock used to generate the data stream. A timestamp, which represents a time of arrival of the PCR sample value, is obtained from the local clock and is associated with the PCR sample value. The digital computer determines a reconstructed system time clock from a set of values comprising the PCR sample value and the timestamp, and previously-received PCR sample values and associated timestamps within a window representative of a predetermined time interval that terminates with the PCR sample value and the timestamp. The digital computer determines a PCR jitter value for the PCR sample value by determining a deviation of the PCR sample value from the reconstructed system time clock. The PCR jitter value represents a variation in the arrival time of the PCR sample value with respect to the reconstructed system time clock.

The reconstructed system time clock is preferably determined by determining a line of best fit to the set of values within the window. The slope and the offset of the line of best fit are calculated. The line of best fit represents the reconstructed time clock.

The above procedure is preferably repeated for a plurality of PCR sample values extracted from the data stream to provide a plurality of PCR jitter values. The PCR jitter values are determined in real time as the PCR sample values are received, without waiting for all PCR sample values to be received. The window is shifted relative to the set of PCR sample values and timestamps for each new PCR sample value received, so that a predetermined number of the most recently received sample values is used to determine the line of best fit. Thus, a sliding window is used to determine PCR jitter values.

The step of determining the line of best fit preferably includes a recursive linear regression calculation on the set of PCR sample values and timestamps within the window. The variance of the PCR jitter values may also be determined using a recursive calculation.

The invention provides an accurate measurement of PCR jitter for each PCR sample value received. The PCR jitter measurement is available in real time as the PCR samples are received. The accuracy of the PCR jitter measurement is independent of the number of PCR sample values received. Furthermore the PCR jitter measurement quickly adjusts to a change in parameters, such as a change in network delay or clock slew.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
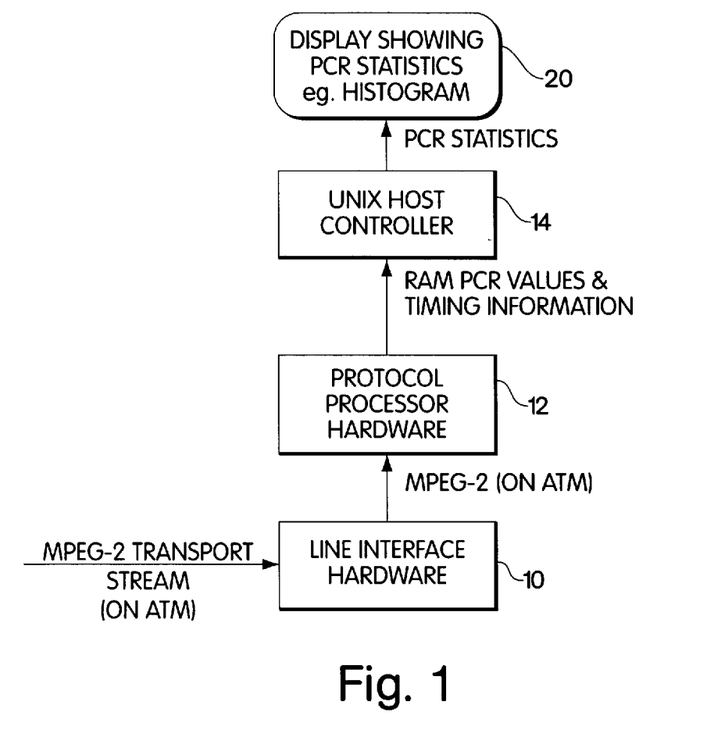
FIG. 1 is a block diagram of an example of a test instrument suitable for implementing PCR jitter measurement in accordance with the invention.

A block diagram of a test instrument for analyzing a MPEG-2 transport stream is shown in FIG. 1. Line interface hardware 10 receives an MPEG-2 transport stream, which may be transmitted from a remote location. The MPEG-2 transport stream is typically received on ATM and possibly a physical layer, such as SONET. The MPEG-2 transport stream data is supplied to a protocol processor 12. The protocol processor 12 receives each packet in the MPEG-2 transport stream and identifies information in the header in accordance with the MPEG-2 protocol. The protocol processor 12 also includes a decoder for decoding the payload information. Selected information can be extracted from the MPEG-2 transport stream by the protocol processor 12. Suitable line interface hardware and protocol processors are known in the art and are commercially available. For example, the line interface hardware may be a Model E1697A, and the protocol processor may be a Model E4209B, both sold by Hewlett-Packard Company.

Selected information from the protocol processor 12 is supplied to a host controller 14, which analyzes the selected information and provides results to a display unit 20. The display unit 20 may, for example, be a video monitor. The host controller 14 may be a general purpose computer, such as, for example, a type E1499, and may utilize the Unix operating system.

The MPEG-2 transport stream analyzer shown in FIG. 1 may perform functions such as real time analysis of program clock reference statistics, packet identifier statistics, program specific information table monitoring, transport stream and global error indicators, header statistics and header field matching. The test instrument may also provide triggering and pattern matching functions, and decoding and display of the video contained in the transport stream.

As indicated above, the MPEG-2 transport stream is 188 bytes long and includes a header and a payload. The following header information is relevant to the present invention. The header includes a two-bit adaptation control field, which indicates whether the transport stream packet includes an adaptation field. The header also includes a 13-bit packet identifier (PID) field, which identifies the program with which the packet is associated. The MPEG-2 transport stream may carry multiple programs simultaneously, with each program identified by the PID. The adaptation field includes a one-bit PCR flag, which indicates whether the adaptation field contains a PCR field. The program clock reference (PCR) field is a 42-bit field coded in two parts, a 33-bit program clock reference base and a 9-bit program clock reference extension. The PCR base and the PCR extension are defined by the MPEG-2 protocol. The PCR indicates the intended time of arrival of the byte containing the last bit of the PCR base at the input of the system target decoder. The PCR represents the time at which the packet was transmitted in units of a system time clock count. PCR samples are usually not included in every transport stream packet.

The present invention provides a method and apparatus for measuring PCR jitter in the MPEG-2 transport stream. The PCR jitter is defined as the difference between the actual arrival time of a PCR sample value and the expected arrival time based on system time clock (STC) at the source of the transport stream. Before the PCR jitter can be estimated, the system time clock must be recovered from the PCR sample values in the transport stream. The PCR jitter can then be measured as deviations from the system time clock. The system time clock is subject to frequency variations, but such frequency variations can be ignored for short segments of the transport stream. In determining PCR jitter, the system time clock frequency is assumed to be constant.

Figure 2:
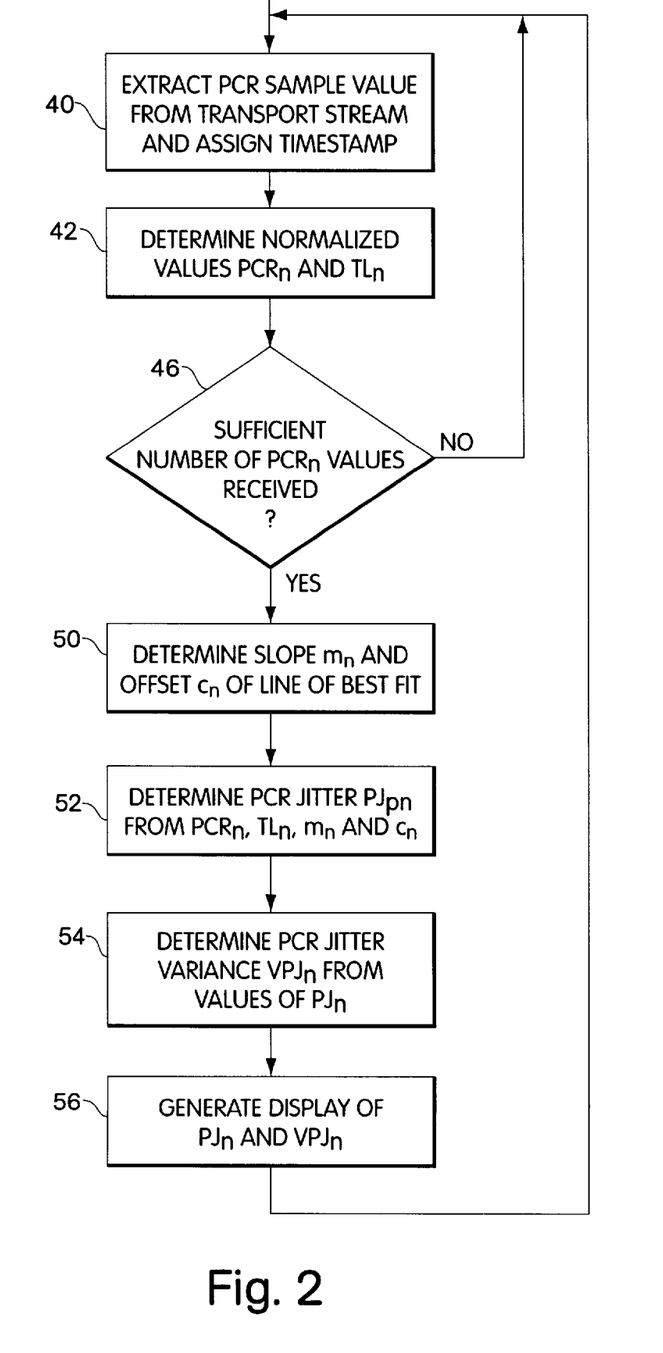
FIG. 2 is a flow diagram of a first embodiment of a routine for PCR jitter measurement.

A flow chart of a first embodiment of a routine for determining PCR jitter is shown in FIG. 2. PCR jitter is determined by a software routine in the host controller 14 without requiring special dedicated hardware. The PCR jitter measurement routine may, for example, be implemented using the C programming language. In step 40, a PCR sample value is extracted from the transport stream. As indicated above, several programs may be carried by the MPEG-2 transport stream simultaneously. One or more programs may be selected for analysis of PCR jitter. These programs are identified by the program identifier, PID, in the header of the transport stream packet. Although the instrument may analyze more than one program simultaneously, the analysis of one program is described. The routine is repeated for each program of interest. When a transport stream packet with the selected PID and containing a PCR sample value is received, the PCR sample value is extracted from the transport stream and is assigned a timestamp from a local clock. The timestamp establishes the arrival time of the PCR sample value. The received PCR sample value and the timestamp from the local clock are normalized in step 42. The received PCR sample value is normalized as follows:

$$PCR_n = ((PCR_{base\ n} \times 300) + PCR_{ext\ n})/27 \quad (1)$$

where $PCR_{base}$ represents the 33-bit PCR base field, $PCR_{ext}$ represents the 9-bit PCR extension field and $PCR_n$ represents a normalized PCR sample value, given in units of microseconds. The timestamp ticks provided by the local clock are counts of tens of nanoseconds. Normalized timestamp values $TL_n$ are obtained by dividing the raw local clock count by 100. Thus, the data associated with each PCR sample value includes a normalized PCR sample value, $PCR_n$, and an associated normalized timestamp, $TL_n$, both in microseconds.

In order to determine PCR jitter, the system time clock is recovered from the PCR sample values, and the PCR jitter for each PCR sample value is measured as a deviation of the PCR sample value from the recovered system time clock. The system time clock may be recovered using a linear regression model based on the local timestamps of the transport stream packets containing the PCR sample values. The timestamp is based on the arrival time of the last byte in the transport stream packet containing the PCR.

After two PCR sample values are received, a line connecting those sample values may be drawn. The line represents the first estimation of the system time clock. As further PCR samples are received, the least squares linear regression model may be used to make successive estimations of the line of best fit, which represents the reconstructed system time clock. A graph of normalized PCR sample value, $PCR_n$, as a function of normalized timestamp, $TL_n$, should approach unity slope when there is no frequency variation in the encoder system time clock or the local clock.

Figure 3:
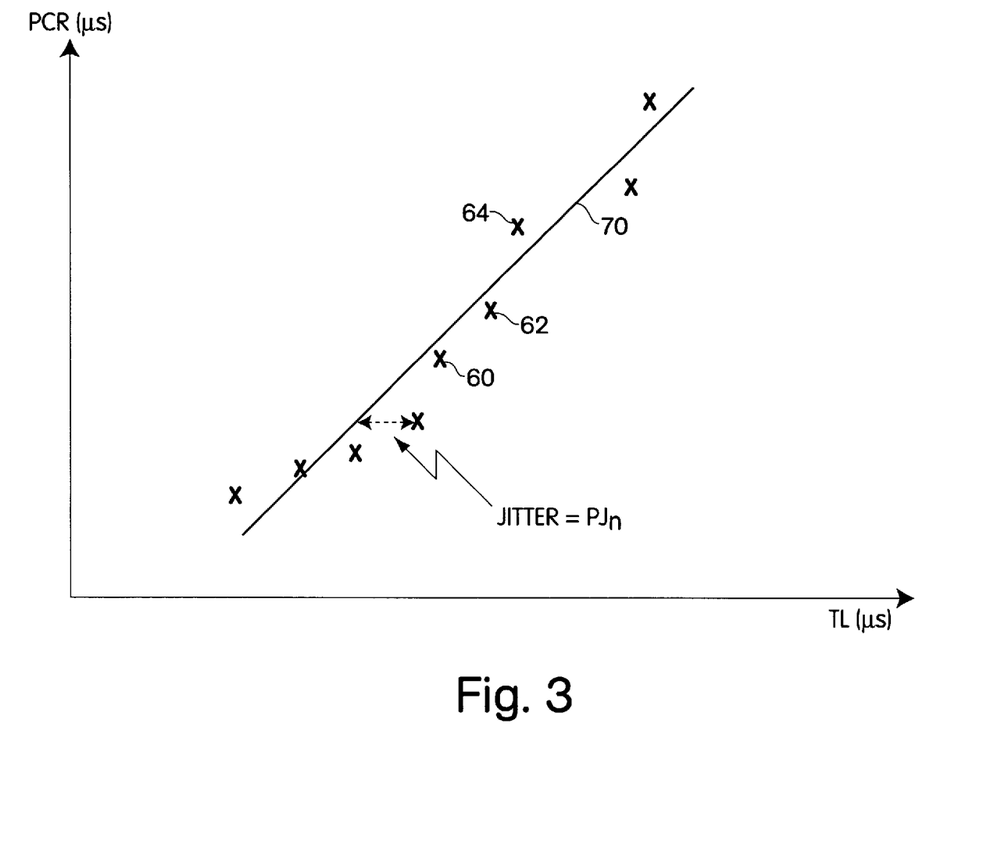
FIG. 3 is a graph of normalized PCR values as a function of normalized PCR arrival times.

A plot of PCR in microseconds as a function of TL in microseconds after several PCR sample values is shown in FIG. 3. Normalized PCR samples values, $PCR_n$ and corresponding normalized timestamps, $TL_n$, are plotted as points 60, 62, 64, etc. A line of best fit 70 can be determined for any set of two or more sample values. The line of best fit 70 represents the recovered system time clock from the source of the transport stream. The line of best fit 70 is a graph of the time at which the packet was transmitted (normalized PCR sample value) as a function of PCR arrival time (normalized timestamp). The line of best fit 70 should have a slope of one or approximately one. The PCR jitter, $PJ_n$ of each PCR sample value is the horizontal distance parallel to the TL axis between each sample point and the line of best fit 70. The PCR jitter represents a time deviation of the PCR sample value from the recovered system time clock.

In order to determine PCR jitter, the line of best fit 70 may be first determined using a linear regression model. The line of best fit is given by:

$$PCR = m_n \times TL + c_n \qquad (2)$$

where $m_n$ represents the slope of the line of best fit, and $c_n$ represents the offset (the PCR axis intercept) of the line of best fit after n samples. The values of slope $m_n$ and offset $c_n$ are determined in accordance with the linear regression model by the following equations:

$$m_n = \frac{n \sum_{i=0}^{n} TL_i PCR_i - \left(\sum_{i=0}^{n} TL_i\right)\left(\sum_{i=0}^{n} PCR_i\right)}{n \sum_{i=0}^{n} TL_i^2 - \left(\sum_{i=0}^{n} TL_i\right)^2} \qquad (3)$$

$$c_n = \frac{\sum_{i=0}^{n} PCR_i - m \sum_{i=0}^{n} TL_i}{n} \qquad (4)$$

On each successive sample ($TL_n$, $PCR_n$), the slope $m_n$ and the offset $c_n$ of the line of best fit are recalculated in accordance with Equations (3) and (4). However, it will be understood that it is not necessary to repeat each calculation in its entirety. Instead, the sums in the expressions for slope and offset are saved after each calculation. When each new sample ($TL_n$, $PCR_n$), is received, the new values are added to the appropriate sums in the expressions for slope and offset to provide new values of slope and offset. Thus, a new line of best fit is determined for each new PCR sample value with a minimum of calculation. As discussed below, by calculating the line of best fit in real time, the PCR jitter and PCR jitter variance can also be calculated in real time, rather than waiting until all PCR sample values are received. If it is assumed that there is little or no slew in the system time clock and the local timestamping clock, the successive estimations of slope and offset become stable after an initial training period and the mean jitter approaches zero for a large number of PCR samples.

Referring again to FIG. 2, when a sufficient number of normalized $PCR_n$ values have been received, as determined in step 46, the slope $m_n$ and offset $c_n$ of the line of best fit are calculated in step 50, as described above. When a sufficient number of $PCR_n$ values has not been received, the process simply waits for more PCR sample values to be received in the MPEG-2 transport stream. Preferably, the process waits until the slope and offset are stable within defined limits before using those values in the jitter calculation. In an alternative approach, a line of best fit can be determined after two PCR sample values have been received. The line of best fit is then updated for each new PCR sample value received until a sufficient number of PCR sample values have been received to provide a desired accuracy in the PCR jitter measurement. In step 52, the PCR jitter, $PJ_n$, is determined from the normalized PCR sample value, $PCR_n$, normalized timestamp, $TL_n$, and from the slope $m_n$ and offset $c_n$ of the line of best fit in accordance with the following equation:

$$pJ_n = \left[ TL_n - \frac{PCR_n - c_n}{m_n} \right] \qquad (5)$$

The PCR jitter variance, $VPJ_n$ may optionally be determined in step 54 in accordance with the following equation:

$$VPJ_n = \sum_{i=1}^{n} \frac{([PJ_i])^2}{n-1} \qquad (6)$$

Figure 5:
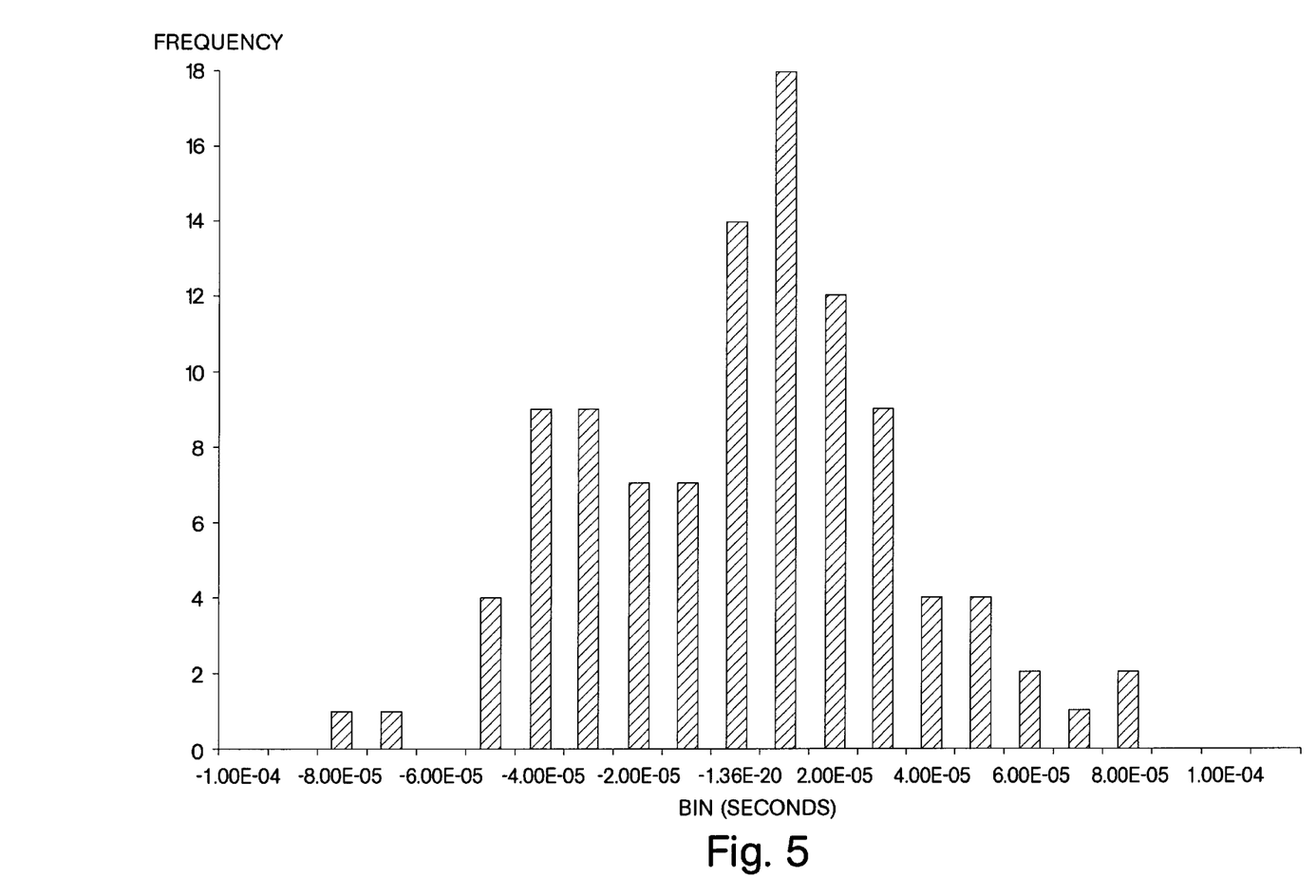
FIG. 5 is an example of a histogram showing the frequency of different PCR jitter values.

The values of PCR jitter and PCR jitter variance are measurements of the physical timing characteristics of a selected program in the MPEG-2 transport stream. The PCR jitter measurement provides an individual PCR jitter value for each PCR sample value received and is available in real time shortly after the PCR sample value is received. The PCR jitter variance is a statistical representation of the PCR jitter values and is recomputed for each new PCR sample value. It will be understood that the calculation of PCR jitter variance is optional. The measured values of PCR jitter and PCR jitter variance may be displayed and/or stored in any desired manner. For example, the measured values may be displayed on the video display unit 20, may be printed and/or may be stored for subsequent analysis. In a preferred embodiment, PCR jitter values are presented on the video display unit 20 in a histogram, as shown in FIG. 5. In the histogram, the horizontal axis is the PCR jitter, $PJ_n$, and the vertical axis is frequency of occurrence. Routines for generating a histogram display using a set of input values are well known to those skilled in the art. As discussed above, PCR jitter values are determined in real time. The histogram may be updated for each new PCR jitter value determined. It will be understood that different display formats can be utilized for presenting the PCR jitter measurements.

Figure 4:
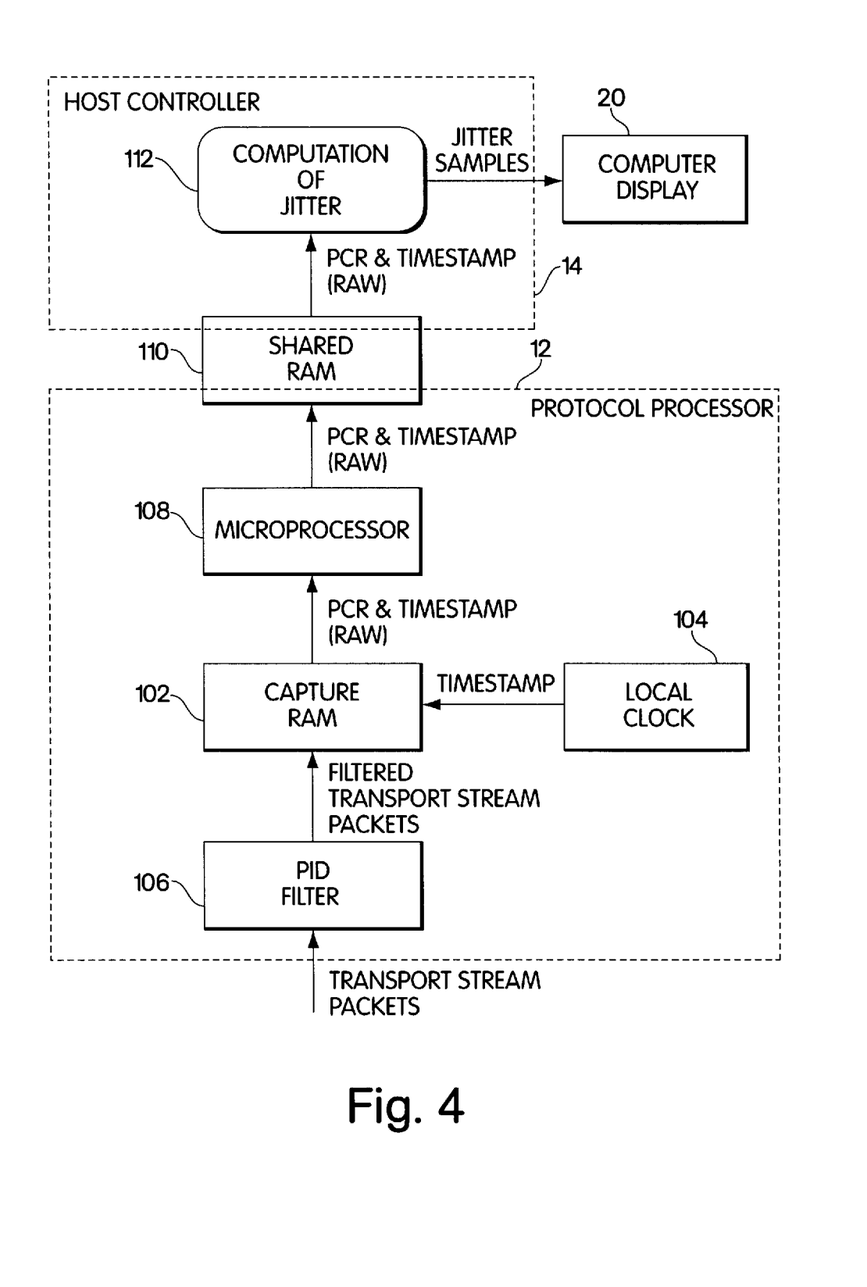
FIG. 4 is a block diagram that illustrates hardware and software components involved in an implementation of the invention.

A preferred implementation of the present invention is described with reference to FIG. 4, which shows portions of the protocol processor 12 (FIG. 1) and the host controller 14. The host controller 14 provides a PID list to the protocol processor 12. The PID list specifies one or more programs in the MPEG-2 transport stream that are to be analyzed. As indicated above, the packet identifier (PID) associates each transport stream packet with a program. The MPEG-2 transport stream is input to a capture RAM 102 in the protocol processor 12 through a PID filter 106. The PID filter 106 selects transport stream packets specified by the PID list and inputs filtered transport stream packets to capture RAM 102. A local clock 104 provides timestamps that are associated with the transport stream packets stored in the capture RAM 102. A microprocessor 108 provides raw PCR and timestamp values from capture RAM 102 to a shared RAM 110. The raw PCR data is accessed by the host controller 14 for computation of the PCR jitter and PCR jitter variance values by software routines in block 112. The computations are performed as described above in connection with Equations (1) to (6). The measured values may be provided to computer display 20 as a histogram and are preferably stored by the host controller 14 for subsequent analysis.

A histogram may be generated for each program, or PID, being monitored. Each bin in the histogram is defined by a range of PCR jitter. The user may specify the histogram range. The bin boundaries are calculated from the range. Respective bin values are incremented for each matching value of PCR jitter, $PJ_n$. The PCR jitter variance, $VPJ_n$, and the number PCR samples may be shown as numerical values on the display.

The technique for determining PCR jitter described above is generally satisfactory, but has certain drawbacks. In particular, the summation of product terms and product of summation terms in Equations (3) and (4) are cumulative over all PCR sample values received. Since the values of these terms increase over time, precision may be lost due to floating point limitations of the computer. Specifically, the computer has a fixed number of bits, such as 32 bits, for representing the summation terms. As the summation terms increase, the least significant bits are dropped, and precision is lost. The loss of precision reduces the accuracy of the calculated slope and offset of the line of best fit, which in turn compromises the accuracy of the PCR jitter measurement.

Calculating the slope and offset of the line of best fit over all PCR sample values received may compromise the sensitivity of the PCR jitter measurement to changes in parameters associated with the PCR jitter measurement. Examples include changes in network delay and/or system clock skew. The reduction in sensitivity is greatest when such changes occur after a large number of PCR sample values has been received by the test instrument.

Figure 6:
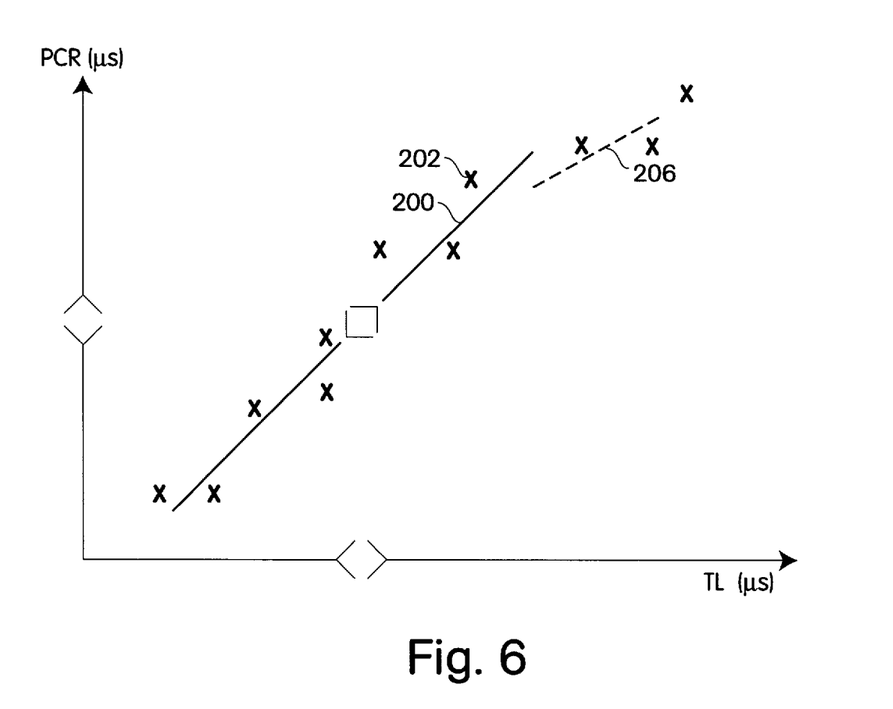
FIG. 6 is a graph of normalized PCR values as a function of normalized PCR arrival times, illustrating the change in slope of the line of best fit that may result from a change in network delay.

The situation is illustrated in FIG. 6, which is a graph of normalized PCR values (PCR) as a function of normalized PCR arrival times (TL). A line of best fit 200 is determined using Equations (3) and (4) for a large number of received PCR sample values. Assume that a change in network delay occurs following PCR sample value 202. Since the parameters of the line of best fit 200 have been calculated over a large number of PCR sample values, the sensitivity to the change in network delay is reduced. Due to the change in network delay, a better line of best fit would be the dashed line 206 shown in FIG. 6. However, due to the weighting of the previous PCR sample values, the calculated line of best fit is likely to be very close to line of best fit 200. As a result, the PCR jitter calculation would be less accurate following the change in network delay.

In order to avoid these drawbacks, a sliding window may be used for calculating the slope and offset of the line of best fit. Instead of using all the available PCR sample values in calculating the slope and offset of the line of best fit, the sliding window uses only the PCR sample values within a window representative of a predetermined time interval. The phrase "sliding window" may be defined as follows. The window includes a predetermined number of recently received sample values and slides in the sense that it is shifted to include each newly-received sample value. Sliding, or shifting, may be implemented by adding the newly-received sample value to the sample values in the window and discarding the oldest sample value. Thus, only recently-received PCR sample values are used in calculating the slope and offset. The window terminates with the current PCR sample value and timestamp.

The size of the window may be varied within the scope of the present invention. A preferred window size includes about 500 PCR sample values and associated timestamps. By limiting the number of sample values used in the calculation, there is minimal loss in precision due to the floating point limitation of the computer, and the PCR jitter measurement is more accurate.

Figure 7:
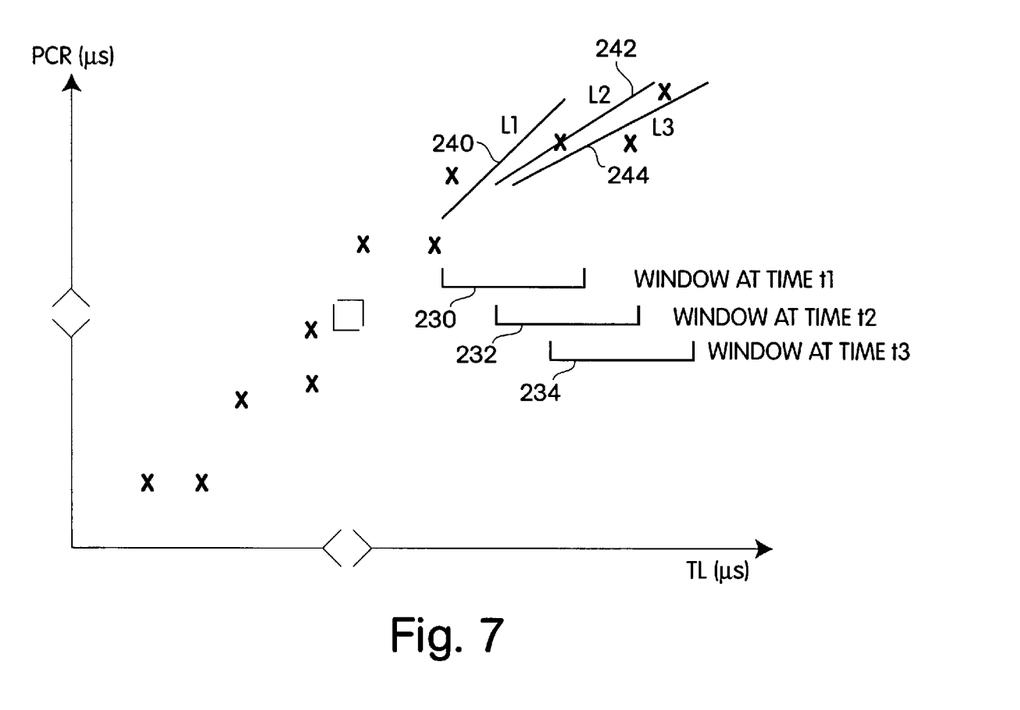
FIG. 7 is a graph of normalized PCR values as a function of normalized PCR arrival times, illustrating different lines of best fit at different window times.

In addition, the sensitivity of the PCR jitter measurement to changes, such as changes in network delay and/or clock skew, is improved. A graph of normalized PCR values as a function of normalized PCR arrival times is shown in FIG. 7. The sliding window technique is illustrated as a window 230 at time t1, a window 232 at time t2 and a window 234 at time t3. It is assumed that a change in network delay occurs during time t1. Lines of best fit 240, 242 and 244 are calculated at times t1, t2 and t3, respectively. As illustrated, the line of best fit changes in response to the change in network delay. The PCR jitter measurement using the sliding window approach converges to the ideal line of best fit faster, since the ratio of the number of sample values affected by the change in network delay to the number of sample values prior to the change increases much more quickly. As the window slides, it reaches a point where the line of best fit is determined solely by the sample values after the change in network delay.

The sliding window approach to PCR jitter measurement may be understood by considering sample values ($TL_1$, $PCR_1$), ($TL_2$, $PCR_2$), ... ($TL_n$, $PCR_n$), ($TL_{n+1}$, $PCR_{n+1}$). For a window having a size n, the slope and offset of the line of best fit are first calculated using the sample values 1 to n. When the sample value n+1 is received, the sample value ($TL_1$, $PCR_1$) is discarded, and the slope and offset of the line of best fit are calculated using sample values 2 to n+1. This process is repeated for each new sample value received, so that the window slides with respect to the set of received sample values. The window slides one sample value at a time, such that the new sample value falls within the window and the oldest sample value is discarded.

Through the use of recursive formulas, the computational complexity and overhead associated with the calculation of the slope and offset of the line of best fit, and also the PCR jitter variance, may be reduced. This is achieved by deriving the mathematical equations which express the latest value of each of these quantities as a function of the latest sample value and the previously calculated value of the corresponding quantity.

Since these equations are lengthy, it is convenient to change the notation used above. Henceforth, $TL_i$ and $PCR_i$ shall be represented by $x_i$ and $y_i$, respectively. Also, PCR jitter shall be represented by j. Using this notation, Equation (3) for calculating the slope of the line of best fit can be rewritten as follows.

$$m_n = \frac{A_n}{B_n} = \frac{n \sum_{i=1}^{n} x_i y_i - \left(\sum_{i=1}^{n} x_i\right)\left(\sum_{i=1}^{n} y_i\right)}{n \sum_{i=1}^{n} x_i^2 - \left(\sum_{i=1}^{n} x_i\right)^2} \quad (7)$$

For a window size of n samples, the slope of the line of best fit upon analysis of a new PCR sample value can be calculated using the following recursive equation.

$$m_{n+k} = \frac{A_{n+k}}{B_{n+k}} = \frac{A_{n+k-1} + (y_k - y_{n+k}) \sum_{i=k}^{n+k} x_i + (x_k - x_{n+k}) \sum_{i=k}^{n+k} y_i + (n+1)(x_{n+k} y_{n+k} - x_k y_k)}{B_{n+k-1} + (x_k - x_{n+k})\left(2 \sum_{i=k}^{n+k} x_i - (n+1)(x_k + x_{n+k})\right)} \quad (8)$$

where n represents the number of sample values in the window, k is a positive integer that represents the number of the window as it slides and i is an index. In Equation (8), $A_{n+k-1}$ and $B_{n+k-1}$ represent the numerator and denominator, respectively, from the previous calculation and in the case where k=1, they represent the numerator and denominator, respectively, of Equation (7). Similarly, the variance $V_{n+1}$ (j) of the PCR jitter upon analysis of the next sample value, given the previously calculated variance Vn (j), is given by the following recursive equation.

$$V_{n+1}(j) = \frac{(n-1)V_n(j)}{n} + \frac{(j_{n+1} - j_n)^2}{n+1} \qquad (9)$$

The PCR jitter variance is calculated in accordance with Equation (9) over all sample values, not just the sample values within the window.

Figure 8:
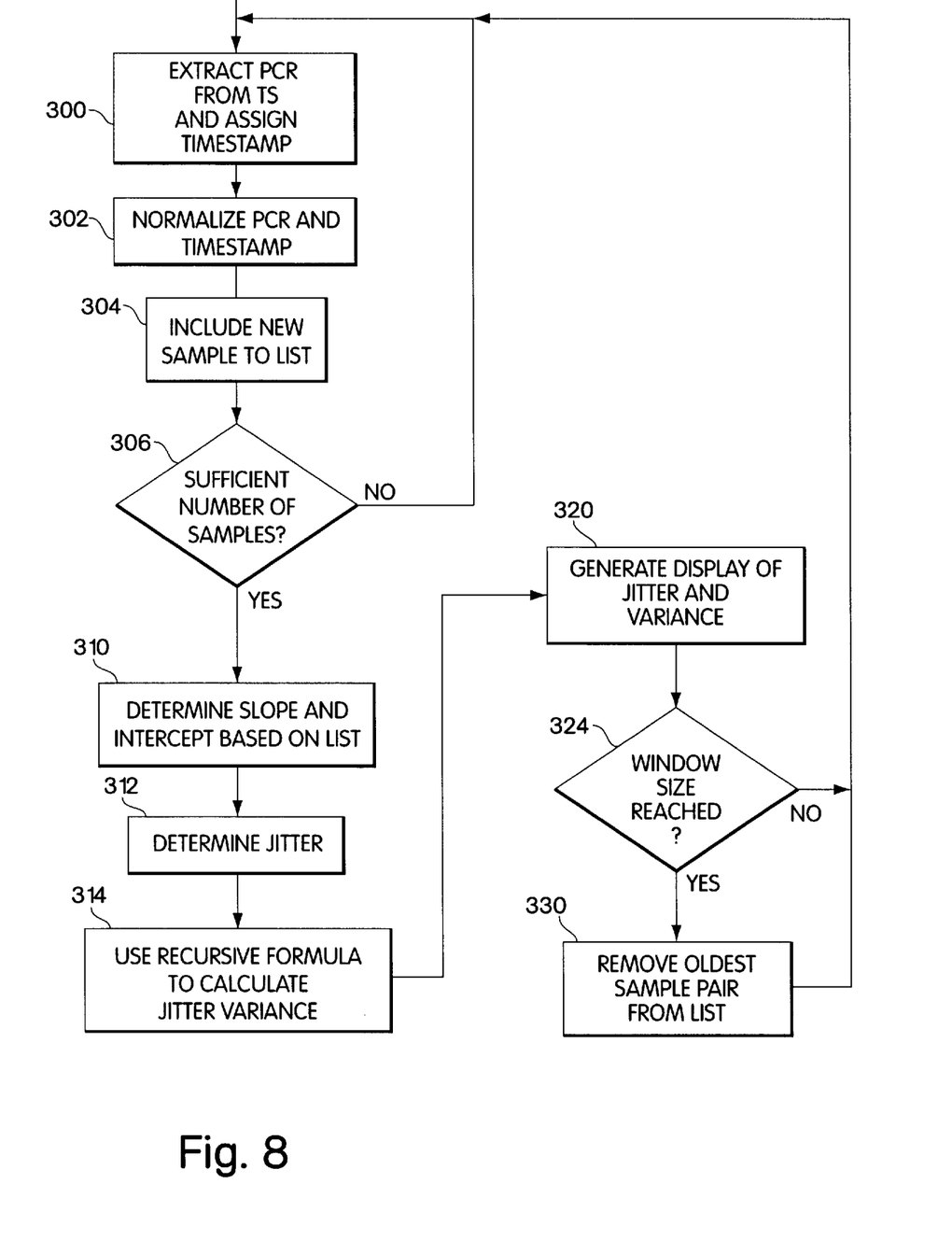
FIG. 8 is a flow diagram of a second embodiment of a routine for PCR jitter measurement.

A flow chart of a second embodiment of a routine for determining PCR jitter is shown in FIG. 8. In step 300, a PCR sample value is extracted from the transport stream and is assigned a timestamp from the local clock. The received PCR sample value and the timestamp from the local clock are normalized in step 302. Steps 300 and 302 may be performed as described above in connection with steps 40 and 42, respectively, of FIG. 2. In step 304, the new normalized PCR sample value and timestamp are written in a list in memory. The list is an array of sample pairs, including the normalized PCR sample values and timestamps. A maximum number of sample pairs in the list is determined by the window size. In step 306, a determination is made whether a sufficient number of PCR sample values has been received to determine the line of best fit within a given accuracy. When a sufficient number of PCR sample values has not been received, the process waits for more PCR sample values to be received. When a sufficient number of PCR sample values has been received, the slope and offset of the line of best fit are determined in step 310. The slope is determined in accordance with Equation (8), and the offset is determined in accordance with Equation (4), where the summations are performed over the sample values that fall within the window. The PCR jitter is determined in step 312 in accordance with Equation (5). Then the PCR jitter variance may optionally be determined in step 314 in accordance with Equation (9). A display of jitter and jitter variance may be generated in step 320, as described above in connection with step 56 of FIG. 2. In step 324, a determination is made as to whether the number sample values received is equal to or greater than the number of sample values in the window. When the number of sample values received is less than the window size, the process returns to step 300 to wait for another PCR sample value. When the number of sample values received is equal to the window size, the oldest PCR sample value and timestamp are removed from the list in step 330. The process then returns to step 300 to wait for another PCR sample value.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for measuring program clock reference (PCR) jitter in a data stream containing digitally encoded information and PCR samples, comprising the steps of:

a) providing a test instrument including a line interface circuit for receiving the data stream, a digital computer connected to the line interface circuit for processing the data stream and a local clock for generating timestamps;

b) said digital computer extracting a PCR sample value from the data stream, said PCR sample value representing a count of a system time clock used to generate said data stream;

c) said digital computer obtaining a timestamp from said local clock and associating the timestamp with said PCR sample value, said timestamp representing a time of arrival of said PCR sample value;

d) said digital computer determining a reconstructed system time clock from a set of values comprising said PCR sample value and said timestamp, and previously-received PCR sample values and associated timestamps within a window representative of a predetermined time interval that terminates with said PCR sample value and said timestamp; and e) said digital computer determining a PCR jitter value for said PCR sample value by determining a deviation of said PCR sample value from said reconstructed system time clock, said PCR jitter value representing a variation in arrival time of said PCR sample value with respect to said reconstructed system time clock.

2. A method as defined in claim 1 wherein the step of determining the reconstructed system time clock includes determining a line of best fit to said set of values within said window, said line of best fit representing said reconstructed system time clock.

3. A method as defined in claim 2 wherein the step of determining the line of best fit includes determining a slope and an offset of said line of best fit.

4. A method as defined in claim 1 wherein said data stream comprises an MPEG-2 transport stream.

5. A method as defined in claim 1 wherein the step of determining the reconstructed system time clock includes performing a recursive linear regression calculation on said set of values within said window.

6. A method as defined in claim 1 further including repeating steps b)–e) for a plurality of PCR sample values from said data stream to provide a plurality of PCR jitter values in real time.

7. A method as defined in claim 6 wherein the step of determining the reconstructed system time clock for each new PCR sample value includes shifting said window to include said new PCR sample value.

8. A method as defined in claim 6 further including the step of determining the variance of said PCR jitter.

9. A method as defined in claim 6 further including the steps of providing said test instrument with a display unit and displaying said plurality of PCR jitter values on said display unit.

10. A method as defined in claim 6 further including the steps of providing said test instrument with a display unit and displaying said plurality of PCR jitter values in a histogram on said display unit.

11. A test instrument for measuring program clock reference (PCR) jitter in a data stream containing digitally encoded information and PCR samples, comprising:

a line interface circuit for receiving the data stream;

a local clock for generating timestamps;

a digital computer connected to the line interface circuit for processing the data stream, said digital computer comprising:

means for extracting a PCR sample value from the data stream, said PCR sample value representing a count of a system time clock used to generate said data stream;

means for obtaining a timestamp from said local clock and associating the timestamp with said PCR sample value, said timestamp representing a time of arrival of said PCR sample value;

means for determining a reconstructed system time clock from a set of values comprising said PCR sample value and said timestamp, and previously-received PCR sample values and associated timestamps within a window representative of a predetermined time interval that terminates with said PCR sample value and said timestamp; and means for determining a PCR jitter value for said PCR sample value by determining a deviation of said PCR sample value from said reconstructed system time clock.

12. A test instrument as defined in claim 11 wherein said means for determining the reconstructed system time clock includes means for determining a line of best fit to said set of values within said window, said line of best fit representing said reconstructed system time clock.

13. A test instrument as defined in claim 12 wherein said means for determining the line of best fit includes means for determining a slope and an offset of said line of best fit.

14. A test instrument as defined in claim 11 wherein said data stream comprises an MPEG-2 transport stream.

15. A test instrument as defined in claim 11 wherein said means for determining the reconstructed system time clock includes means for performing a recursive linear regression calculation on said set of values within said window.

16. A test instrument as defined in claim 11 wherein said digital computer includes means for updating said reconstructed system time clock and means for determining a PCR jitter value for each of a plurality of new PCR sample values received in said data stream to provide a plurality of PCR jitter values.

17. A test instrument as defined in claim 16 wherein said means for updating said reconstructed system time clock includes means for shifting said window to include each of said new PCR sample values.

18. A test instrument as defined in claim 16 wherein said digital computer further includes means for determining the variance of said PCR jitter.

19. A test instrument as defined in claim 16 wherein said digital computer further includes a display unit and means for displaying said plurality of PCR jitter values on said display unit.

20. A test instrument as defined in claim 16 wherein said digital computer further includes a display unit and means for displaying said plurality of PCR jitter values in a histogram on said display unit.

* * * * *